US012270411B2

(12) United States Patent
Yamamoto et al.

(10) Patent No.: US 12,270,411 B2
(45) Date of Patent: Apr. 8, 2025

(54) PROPELLER FAN, BLOWER, AND AIR CONDITIONER

(71) Applicant: Mitsubishi Electric Corporation, Tokyo (JP)

(72) Inventors: Katsuyuki Yamamoto, Tokyo (JP); Takuya Teramoto, Tokyo (JP); Atsushi Kono, Tokyo (JP); Takahide Tadokoro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/687,560

(22) PCT Filed: Nov. 5, 2021

(86) PCT No.: PCT/JP2021/040839

§ 371 (c)(1),
(2) Date: Feb. 28, 2024

(87) PCT Pub. No.: WO2023/079697

PCT Pub. Date: May 11, 2023

(65) Prior Publication Data

US 2025/0003420 A1 Jan. 2, 2025

(51) Int. Cl.
*F04D 29/38* (2006.01)

(52) U.S. Cl.
CPC ...... *F04D 29/384* (2013.01); *F05D 2240/303* (2013.01); *F05D 2240/304* (2013.01)

(58) Field of Classification Search
CPC ............. F04D 29/384; F05D 2240/303; F05D 2240/304
See application file for complete search history.

(56) References Cited

U.S. PATENT DOCUMENTS 6,450,760 B1 * 9/2002 Furukawa ............. F04D 29/384 416/189
2011/0017427 A1 * 1/2011 Kato ......................... F24F 1/40 165/59
2020/0240429 A1 * 7/2020 Tadokoro .............. F04D 29/384

FOREIGN PATENT DOCUMENTS

JP S62-282198 A 12/1987
JP 2003-184792 A 7/2003

(Continued)

OTHER PUBLICATIONS

International Search Report of the International Searching Authority mailed Jan. 18, 2022 in corresponding International Application No. PCT/JP2021/040839 (and English translation).

(Continued)

*Primary Examiner* — Michael L Sehn
(74) *Attorney, Agent, or Firm* — Posz Law Group, PLC

(57) ABSTRACT

A propeller fan according to the present disclosure includes a rotation shaft and a blade rotating around the rotation shaft. At the same position in an axial direction of the rotation shaft, a first locus connecting a leading edge of the blade and an outer peripheral end of the blade is tilted with respect to a second locus connecting a center of the rotation shaft and the leading edge so that the outer peripheral end side is inclined toward a trailing side. Alternatively, a third locus connecting a root of the blade and the outer peripheral end of the blade is tilted with respect to a fourth locus connecting a center of the rotation shaft and the root so that the outer peripheral end side is inclined toward the trailing side.

8 Claims, 4 Drawing Sheets

(56) References Cited

FOREIGN PATENT DOCUMENTS

| | | | |
|---|---|---|---|
| JP | 2006-233886 | A | 9/2006 |
| JP | 4467952 | B2 | 5/2010 |

OTHER PUBLICATIONS

Extended European Search Report dated Nov. 28, 2024 issued for the corresponding European Patent Application No. 21963292.4.

* cited by examiner

PROPELLER FAN, BLOWER, AND AIR CONDITIONER

CROSS REFERENCE TO RELATED APPLICATION

This application is a U.S. national stage application of PCT/JP2021/040839 filed on Nov. 5, 2021, the contents of which are incorporated herein by reference.

TECHNICAL FIELD

The present disclosure relates to a propeller fan, a blower, and an air conditioner.

BACKGROUND ART

PLT 1 describes a propeller fan. The propeller fan includes a rotation shaft, and a blade rotating around the rotation shaft.

CITATION LIST

Patent Literature

[PLT 1] JP 4467952 B2

SUMMARY

Technical Problem

In the conventional propeller fan described in PLT 1 and the like, sufficient energy cannot be given from the blade to a flow from the side face of the propeller fan.

The present disclosure is intended to solve the problem as described above. An object of the present disclosure is to obtain a propeller fan advantageous in energy efficiency.

Solution to Problem

A propeller fan according to the present disclosure includes a rotation shaft, and a blade rotating around the rotation shaft.

At the same position in an axial direction of the rotation shaft, a first locus connecting a leading edge of the blade and an outer peripheral end of the blade is tilted with respect to a second locus connecting the center of the rotation shaft and the leading edge so that the outer peripheral end side is inclined toward a trailing side.

Alternatively, at the same position in an axial direction of the rotation shaft part, a third locus connecting a root of the blade and an outer peripheral end of the blade is tilted with respect to a fourth locus connecting a center of the rotation shaft and the root so that the outer peripheral end side is inclined toward a trailing side.

Advantageous Effects

According to the present disclosure, it is possible to obtain a propeller fan advantageous in energy efficiency.

DESCRIPTION OF EMBODIMENT

Hereinbelow, an embodiment will be described with reference to the accompanying drawings. Note that common or corresponding elements will be denoted by the same reference signs throughout the drawings, and redundant description will be simplified or omitted in the present disclosure. Note that the present disclosure is not limited to the embodiment described below and can include all combinations and modifications of the configurations disclosed in the following embodiment.

Embodiment 1

Figure 1:
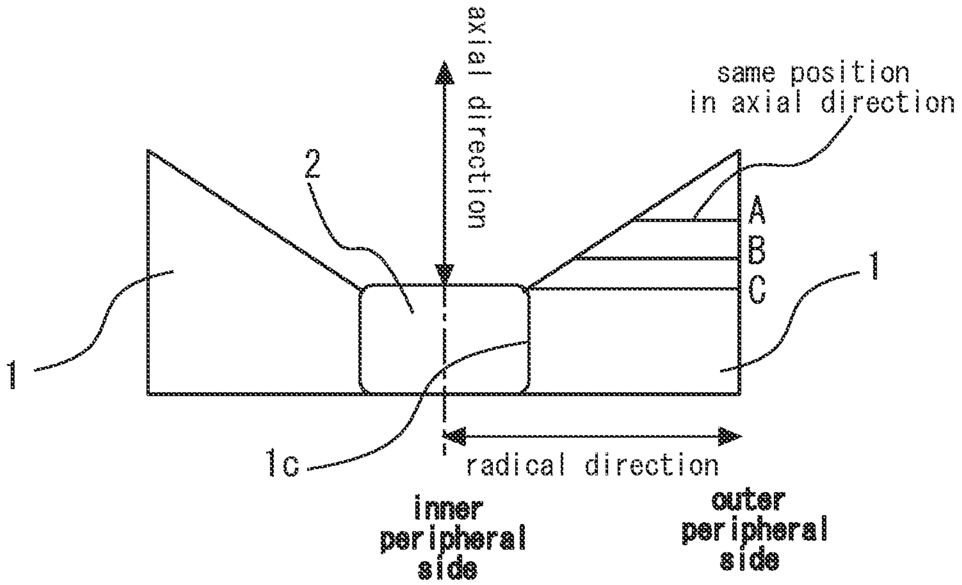
FIG. 1 is a side view illustrating a propeller fan of Embodiment 1.
Figure 2:
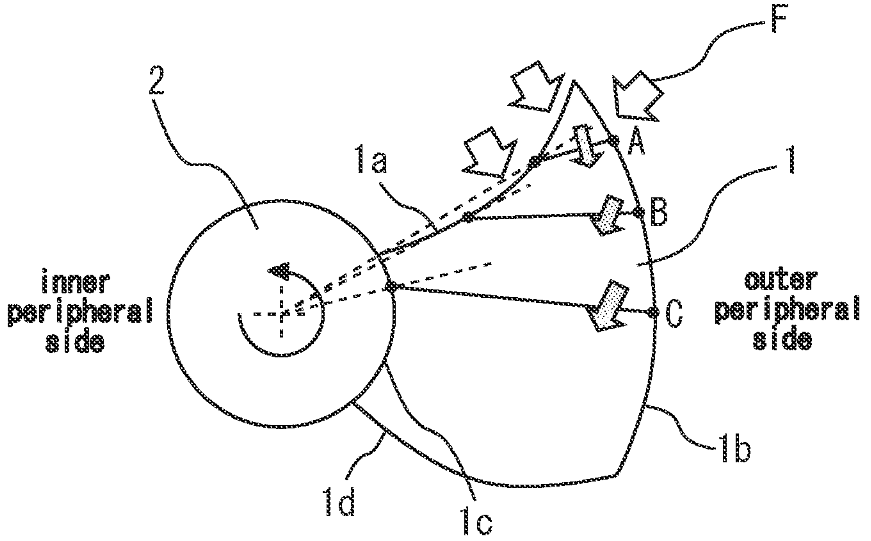
FIG. 2 is a front view illustrating the propeller fan of Embodiment 1.

FIG. 1 is a side view illustrating a propeller fan of Embodiment 1. FIG. 2 is a front view illustrating the propeller fan of Embodiment 1. The propeller fan according to the present disclosure includes a shaft, and a blade 1 rotating around the rotation shaft. The rotation shaft is formed as a boss 2 as an example.

The propeller fan according to the present embodiment is characterized by the shape of the blade 1. Specifically, at the same position in an axial direction of the rotation shaft, a first locus connecting a leading edge 1*a* of the blade 1 and an outer peripheral end 1*b* of the blade 1 is tilted with respect to a second locus connecting a center of the rotation shaft and the leading edge 1*a* so that the outer peripheral end 1*b* side is inclined toward a trailing side. Alternatively, at the same position in the axial direction of the rotation shaft, a third locus connecting a root 1*c* of the blade 1 and the outer peripheral end 1*b* of the blade 1 is tilted with respect to a fourth locus connecting the center of the rotation shaft and the root 1*c* so that the outer peripheral end 1*b* side is inclined toward the trailing side.

FIGS. 1 and 2 illustrate the characteristic of the shape described above. In FIG. 1, lines indicated by reference characters A, B, and C illustrate "the same position in the axial direction of the rotation shaft". The first locus and the third locus described above are shown as solid-line loci in FIG. 2. Also, the second locus and the fourth locus are shown as dashed-line loci in FIG. 2. Reference characters A, B, and C in FIG. 2 correspond to reference characters A, B, and C in FIG. 1, respectively.

In the propeller fan having the above-mentioned characteristic, a blade surface where the blade 1 receives a flow F from a fan side face containing a radial component of the propeller fan faces the flow F to no small extent. Accordingly, energy can be efficiently given from the blade 1 to the flow F from the fan side face. According to the present embodiment, it is possible to obtain the propeller fan advantageous in energy efficiency.

The propeller fan according to the present embodiment is applicable, for example, to any blower. A blower is a device that performs air blowing using an air current generated by a propeller fan.

Figure 3:
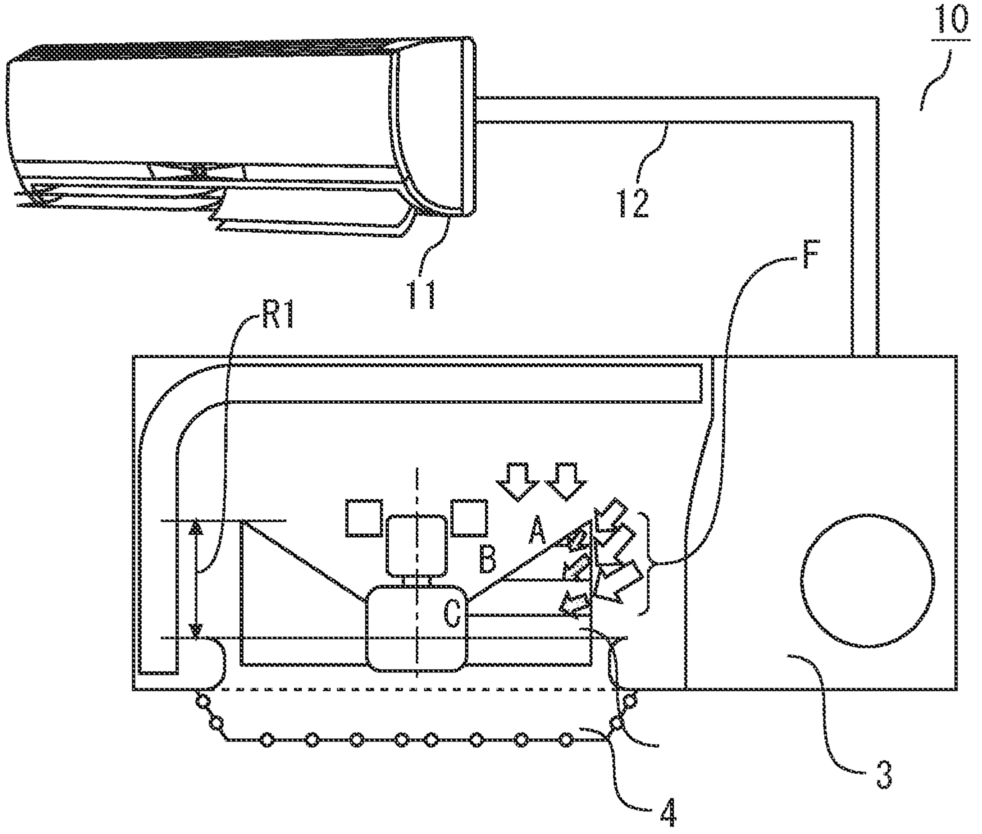
FIG. 3 is a diagram showing an application example of the propeller fan of Embodiment 1.

Also, FIG. 3 is a diagram showing an application example of the propeller fan of Embodiment 1. The propeller fan according to the present embodiment can be installed, for example, in an outdoor unit 3 of an air conditioner 10. The air conditioner 10 includes an indoor unit 11 that performs, for example, air blowing into a room, and an outdoor unit 3 connected to the indoor unit 11 through a pipe 12. The propeller fan applied to the outdoor unit 3 is, for example, covered with a semi-open type bell mouth 4 that does not cover the upstream side of the propeller fan. Note that, also when the propeller fan is applied to a device other than the outdoor unit 3, the propeller can be covered with the semi-open type bell mouth 4 to be used.

The semi-open type bell mouth 4 covers a part of the blade 1. A region in which the blade 1 is not covered with the bell mouth, that is, a region R1 in which the blade 1 and the bell mouth 4 do not overlap, a large flow F from the fan side face to the blade 1 can occur. Thus, it is desirable that the tilt of the first locus with respect to the second locus described above be formed at least in the region R1 in which the bell mouth 4 and the blade 1 do not overlap. Similarly, it is desirable that the tilt of the third locus with respect to the fourth locus be formed at least in the region R1 in which the bell mouth 4 and the blade 1 do not overlap.

Figure 4:
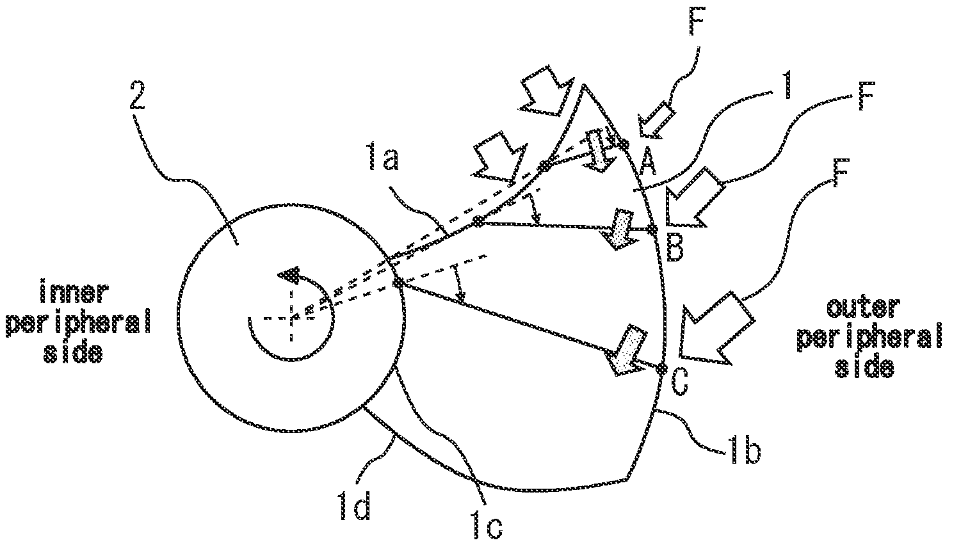
FIG. 4 is a front view illustrating a first modification of the propeller fan of Embodiment 1.

Also, FIG. 4 is a front view illustrating a first modification of the propeller fan of Embodiment 1. Typically, the flow F from the fan side face containing the radial component tends to become larger toward the downstream side, that is, the trailing edge 1*d* side of the blade 1. Thus, as shown in FIG. 4, the tilt of the first locus with respect to the second locus described above may be increased toward the trailing edge 1*d* side of the blade 1. Similarly, the tilt of the third locus with respect to the fourth locus may be increased toward the trailing edge 1*d* side of the blade 1. For example, the tilt of the third locus with respect to the fourth locus may be made larger than the tilt of the first locus with respect to the second locus. Accordingly, it is possible to increase the energy efficiency of the propeller fan. Note that the tilt of the first locus with respect to the second locus does not necessarily have to increase toward the trailing edge 1*d* side of the blade 1 over the entire area. When not a small region in which the tilt of the first locus with respect to the second locus increases toward the trailing edge 1*d* side of the blade 1 is present, the effect of energy efficiency improvement can be achieved. Similarly, the tilt of the third locus with respect to the fourth locus does not necessarily have to increase toward the trailing edge 1*d* side of the blade 1 over the entire area.

Figure 5:
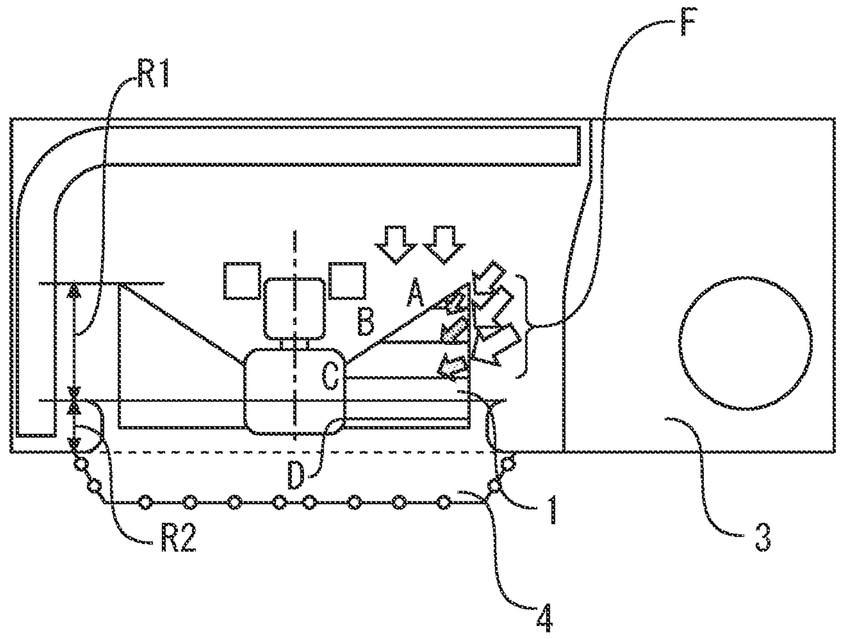
FIG. 5 is a diagram showing an application example of a second modification of the propeller fan of Embodiment 1.
Figure 6:
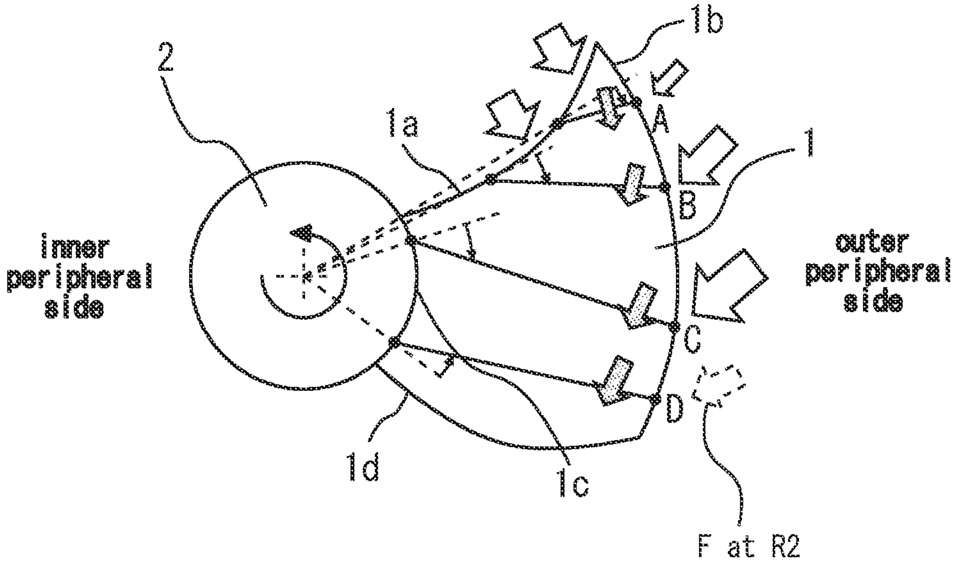
FIG. 6 is a front view illustrating the second modification of the propeller fan of Embodiment 1.

FIG. 5 is a diagram showing an application example of a second modification of the propeller fan of Embodiment 1. FIG. 6 is a front view illustrating a second modification of the propeller fan of Embodiment 1. Lines indicated by reference characters A, B, C, and D in FIG. 5 illustrate "the same position in the axial direction of the rotation shaft" as with the lines indicated by the respective reference characters in FIG. 1. Reference characters A, B, C, and D in FIG. 6 correspond to reference characters A, B, C, and D in FIG. 5, respectively.

In a region R2 in which the bell mouth 4 and the blade 1 overlap, there is less flow F from the fan side face. Thus, the tilt to the trailing side of the first locus with respect to the second locus may be made smaller in the region R2 in which the bell mouth 4 and the blade 1 overlap than in the region R1 in which the bell mouth 4 and the blade 1 do not overlap. Alternatively, the tilt to the rear of the third locus with respect to the fourth locus may be made smaller in the region R2 in which the bell mouth 4 and the blade 1 overlap than in the region R1 in which the bell mouth 4 and the blade 1 do not overlap. Furthermore, the tilt to the trailing side of the third locus with respect to the fourth locus in the region R2 in which the bell mouth 4 and the blade 1 overlap may be made smaller than the tilt to the trailing side of the first locus with respect to the second locus in the region R1 in which the bell mouth 4 and the blade 1 do not overlap. According to this configuration, it is possible to provide the propeller fan having higher energy efficiency.

In particular, as shown in FIG. 6, in the region R2 in which the bell mouth 4 and the blade 1 overlap, the third locus may be tilted with respect to the fourth locus so that the outer peripheral end side of the blade 1 is inclined toward the leading side. Similarly, in the region R2 in which the bell mouth 4 and the blade 1 overlap, the first locus may be tilted with respect to the second locus so that the outer peripheral end side of the blade 1 is inclined toward the leading side.

Figure 7:
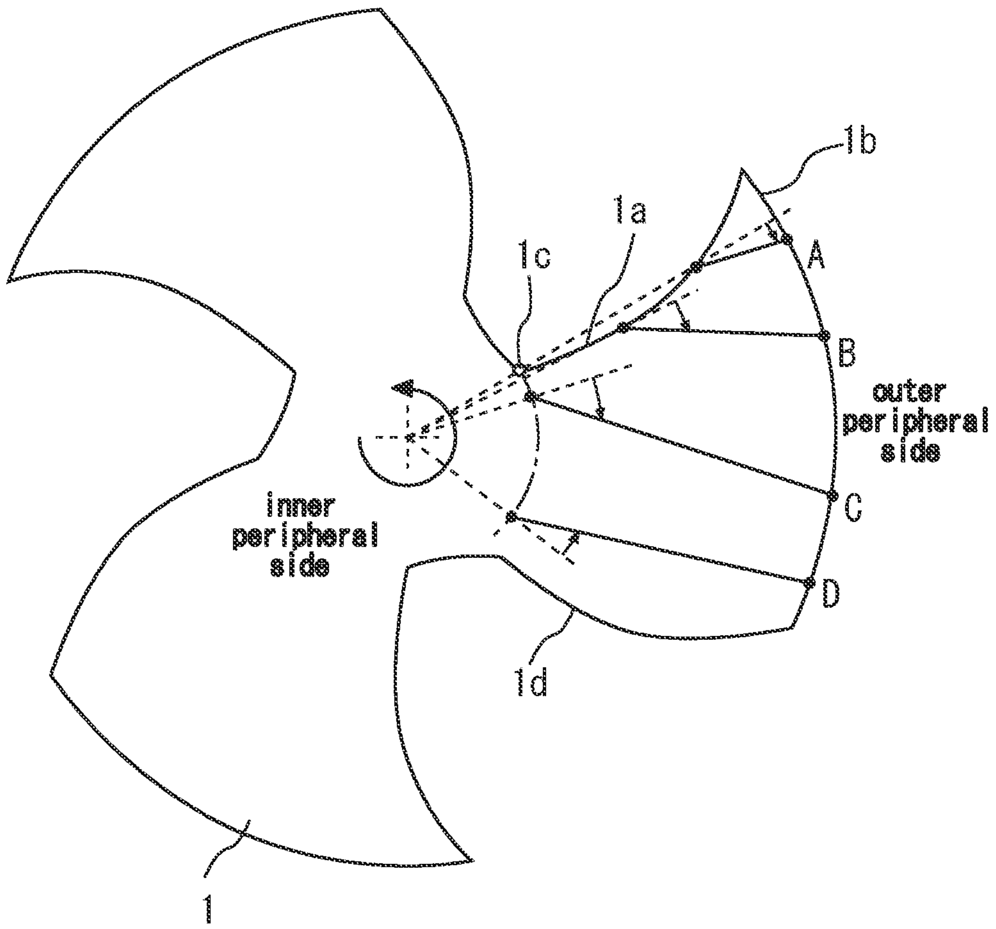
FIG. 7 is a front view illustrating a third modification of the propeller fan of Embodiment.

Also, FIG. 7 is a front view illustrating a third modification of the propeller fan of Embodiment 1. As in the third modification shown in FIG. 7, the propeller fan according to the present disclosure is also applicable, for example, to a bossless form in which the blades 1 are directly and integrally connected to each other without the boss 2. In this case, the rotation shaft is formed on the center of the integrally connected blades 1.

INDUSTRIAL APPLICABILITY

The propeller fan according to the present disclosure can be used in various types of blowers or outdoor units of air conditioners.

REFERENCE SIGNS LIST

1 Blade
1*a* Leading Edge
1*b* Outer Peripheral End
1*c* Root
1*d* Trailing Edge
2 Boss
3 Outdoor Unit
4 Bell Mouth
10 Air Conditioner
11 Indoor Unit
12 Pipe

The invention claimed is:

1. A propeller fan comprising:
a rotation shaft;
a blade rotating around the rotation shaft; and
a semi-open bell mouth covering a part of the blade,
at the same position in an axial direction of the rotation shaft, a first locus connecting a leading edge of the blade and an outer peripheral end of the blade being tilted with respect to a second locus connecting a center of the rotation shaft and the leading edge so that the outer peripheral end side is inclined toward a trailing side, and
the tilt of the first locus with respect to the second locus being formed at least in a region in which the semi-open bell mouth and the blade do not overlap, and the tilt to the trailing side of the first locus with respect to the second locus being smaller in a region in which the semi-open bell mouth and the blade overlap than in the region in which the semi-open bell mouth and the blade do not overlap.

2. The propeller fan according to claim 1, wherein there is a region in which the tilt of the first locus with respect to the second locus increases toward the trailing edge side of the blade.

3. A blower comprising the propeller fan according to claim 1, the blower performing air blowing using an air current generated by the propeller fan.

4. An air conditioner comprising an outdoor unit provided with the propeller fan according to claim 1.

5. A propeller fan comprising:

a rotation shaft;

a blade rotating around the rotation shaft; and a semi-open bell mouth covering a part of the blade, in a region in which the semi-open bell mouth and the blade do not overlap, at the same position in an axial direction of the rotation shaft, a first locus connecting a leading edge of the blade and an outer peripheral end of the blade being tilted with respect to a second locus connecting a center of the rotation shaft and the leading edge so that the outer peripheral end side is inclined toward a trailing side, and in a region in which the semi-open bell mouth and the blade overlap, at the same position in the axial direction of the rotation shaft, the first locus being tilted with respect to the second locus so that the outer peripheral end side is inclined toward the leading side.

6. The propeller fan according to claim 5, wherein there is a region in which the tilt of the first locus with respect to the second locus increases toward the trailing edge side of the blade.

7. A propeller fan comprising:

a rotation shaft;

a blade rotating around the rotation shaft; and a semi-open bell mouth covering a part of the blade, at the same position in an axial direction of the rotation shaft, a third locus connecting a root of the blade and an outer peripheral end of the blade being tilted with respect to a fourth locus connecting a center of the rotation shaft and the root so that the outer peripheral end side is inclined toward a trailing side, and the tilt of the third locus with respect to the fourth locus being formed at least in a region in which the semi-open bell mouth and the blade do not overlap, and the tilt to the rear of the third locus with respect to the fourth locus being smaller in a region in which the semi-open bell mouth and the blade overlap than in the region in which the semi-open bell mouth and the blade do not overlap.

8. The propeller fan according to claim 7, wherein there is a region in which the tilt of the third locus with respect to the fourth locus increases toward the trailing side of the blade.

* * * * *